United States Patent
McDonald et al.

(10) Patent No.: US 7,864,926 B2
(45) Date of Patent: *Jan. 4, 2011

(54) SYSTEM AND METHOD FOR CONDUCTING VARIABLE VOICE PATH ASSURANCE TESTS

(75) Inventors: Randy M. McDonald, Roswell, GA (US); Mortimer P. Burnett, Lawrenceville, GA (US); Terry R. Droke, Woodstock, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 948 days.

This patent is subject to a terminal disclaimer.

(21) Appl. No.: 11/613,309

(22) Filed: Dec. 20, 2006

(65) Prior Publication Data

US 2007/0127629 A1 Jun. 7, 2007

Related U.S. Application Data

(63) Continuation of application No. 10/254,677, filed on Sep. 26, 2002, now Pat. No. 7,190,766.

(51) Int. Cl.
*H04M 1/24* (2006.01)
*H04M 3/08* (2006.01)
*H04M 3/22* (2006.01)
*H04M 15/00* (2006.01)
*H04M 7/00* (2006.01)

(52) U.S. Cl. ............... 379/22; 379/112.01; 379/112.04; 379/221.03

(58) Field of Classification Search ............... 379/1.01, 379/16, 22, 23, 32.01, 32.02, 112.01, 112.04, 379/112.08, 112.1, 221.03
See application file for complete search history.

(56) References Cited

U.S. PATENT DOCUMENTS 7,190,766 B1 * 3/2007 McDonald et al. ............ 379/22
2003/0110243 A1 * 6/2003 Soulhi ........................ 709/223

* cited by examiner

*Primary Examiner*—Quoc D Tran
(74) *Attorney, Agent, or Firm*—Parks IP Law LLC; Jennifer P. Medlin, Esq.

(57) ABSTRACT

A system and method for conducting variable VPA testing is disclosed. The method includes provisions to detect or measure the utilization of a trunk line and use that information to establish a level of VPA testing for that trunk line. Although a wide variety of relationships between the utilization and the amount of VPA testing conducted can be used, the relationship is preferably a generally inverse relationship, in which the amount of VPA testing conducted on a particular trunk is reduced as traffic or utilization of the trunk increases. Conversely, as traffic or utilization of the trunk deceases, the amount of testing conducted on the trunk increases.

11 Claims, 5 Drawing Sheets

$$CSO = \frac{(W1)(x) + (W2)(y) + (W3)(z)}{3}$$

$$CSO = (WP1)(x) + (WP2)(y) + (WP3)(z)$$

SYSTEM AND METHOD FOR CONDUCTING VARIABLE VOICE PATH ASSURANCE TESTS

RELATED CASES

The present application is a continuation of U.S. patent application Ser. No. 10/254,677, entitled SYSTEM AND METHOD FOR CONDUCTING VARIABLE VOICE PATH ASSURANCE TESTS, filed on Sep. 26, 2002, issued as U.S. Pat. No. 7,190,766 on Mar. 13, 2007, and hereby incorporated by reference.

BACKGROUND

1. Field of the Invention

The present invention relates generally to Voice Path Assurance (VPA) testing, and more particularly, to a me for conducting variable VPA testing on trunk groups between telephone central offices.

2. Background of the Invention

VPA testing is systematically conducted on interoffice trunk members to provide routine diagnostic information regarding the condition of the trunk Regular VPA testing can often identify developing problems with a particular trunk and can be used to complete calls using functional network resources.

While valuable, existing VPA testing protocols also have some drawbacks. VPA testing requires the use of both in-band signaling network resources and out-of-band signaling network resources. Because of this, VPA testing can consume unexpectedly high amounts of network resources.

Current systems allow network administrators to set a particular, fixed level of VPA testing. After this level is set, the system continues to conduct VPA testing at the pre-established level regardless of other network conditions. During those periods of time when the network is experiencing a relatively high amount of traffic, this inflexible and fixed level of VPA testing can cause delays and impairments in service.

SUMMARY OF THE INVENTION

The present invention is directed to a method for conducting voice path assurance testing on a trunk group of a telecommunications network. The method includes the steps of determining a utilization level of the telecommunications switching system, and using the utilization level to compute an amount of voice path assurance testing applied to the connecting trunk network. The amount of voice path assurance testing applied to the connecting trunk network is inversely proportional to the system utilization level of the specific switching system processor.

In another aspect, the invention includes a feature such that voice path assurance testing ceases when the utilization level reaches a predetermined threshold.

In another aspect, the invention includes a feature such that all of the calls include voice path assurance testing if the utilization level of the system processor is below a predetermined threshold.

In another aspect, the invention includes a feature such that the amount of voice path assurance testing decreases in a substantially linear manner as the processor utilization level of the switching system increases.

In another aspect, the invention includes a feature such that the amount of voice path assurance testing varies in a substantially linear manner regardless of the architecture used by the switching architecture.

In another aspect, the invention includes a method for conducting voice path assurance testing on a trunk that is part of a communications network including the steps of determining the utilization of the trunk by retrieving a first occupancy level related to a first processor and a second occupancy level related to a second processor, using both the first occupancy level and the second occupancy level to compute a composite occupancy level, and determining an amount of voice path assurance testing conducted on the communications network using the composite occupancy level.

In another aspect, the invention includes a third occupancy level related to a third processor that is also used to compute the composite occupancy level.

In another aspect, the invention includes different weights assigned to different occupancy levels.

In another aspect of the invention, the first weight associated with the first occupancy level is greater than a second weight associated with the second occupancy level.

In another aspect of the invention a third occupancy level related to a third processor is also used to compute the composite occupancy level. The third processor is a trunk/line processor and the second weight associated with the second occupancy level is greater than a third weight associated with the third occupancy level.

In another aspect of the invention, the first weight associated with the first occupancy level is greater than a second weight associated with the second occupancy level.

In another aspect of the invention, the voice path assurance testing ceases when the first occupancy level reaches a first predetermined threshold.

In another aspect of the invention, the voice path assurance testing ceases when the second occupancy level reaches a second predetermined threshold.

In another aspect of the invention a third occupancy level related to a third processor is also used to compute the composite occupancy level. The third processor is a trunk/line processor and the voice path assurance testing ceases when the third occupancy level reaches a third predetermined threshold.

In another aspect, the invention includes a method for conducting voice path assurance testing on a trunk member that is part of a connecting trunk network comprising the steps of determining the utilization of the trunk group by retrieving information related to the trunk group from the switching system resources and determining an amount of voice path assurance testing that will be conducted on the connecting trunk network using the information.

Additional features and advantages of the invention will be set forth in the description which follows, and in part will be apparent from the description, or may be learned by practice of the invention. The objectives and advantages of the invention will be realized and attained by the structure and steps particularly pointed out in the written description, the claims and the drawings.

DETAILED DESCRIPTION OF THE PREFERRED EMBODIMENTS

Figure 1:
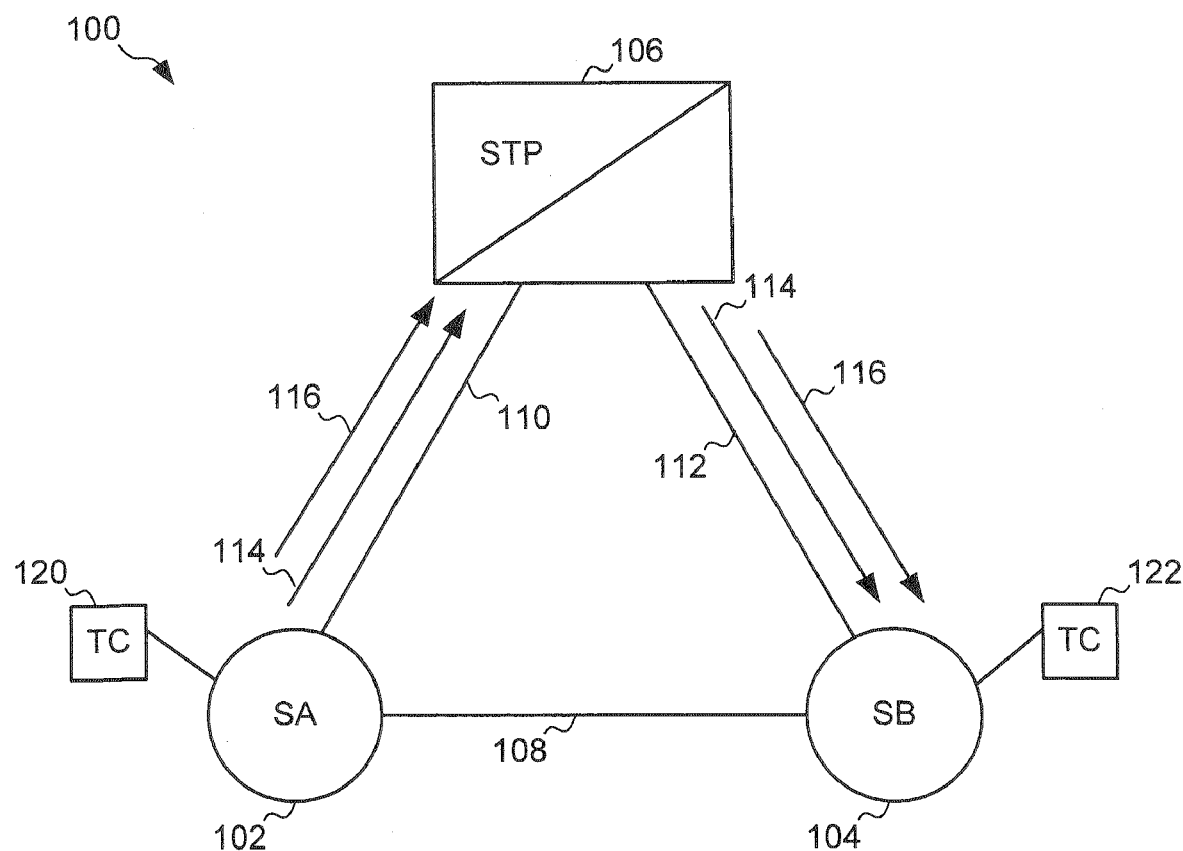
FIG. 1 is a schematic diagram of a preferred embodiment of a system in accordance with the present invention.

FIG. 1 shows an embodiment of a communication network 100 in accordance with the present invention. A first switch, referred to as Switch A 102, is in communication with a second switch, Switch B 104. A trunk group 108, together with its associated members, is used to connect switch A 102 with switch B 104.

The two switches, 102 and 104, also include provisions for links that allow the switches to communicate by using out-of-band signaling. Preferably, the out-of-band signaling is conducted in accordance with industry standard protocols, such as the protocols used in the Signaling System 7 (SS7). In this regard, at least one Advanced Intelligent Network (AIN) device assists or participates in facilitating out-of-band signaling between the two switches 102 and 104. An STP 106 represents one such AIN device. A first communications link 110 connects switch A 102 with STP 106 and a second communications link 112 can be used to connect switch B 104 with STP 106.

Generally, VPA testing, according to the SS7 protocol, is conducted to determine the functional capabilities of various members in trunk group 108. The VPA test is initiated by an instruction or information element embedded in the SS7 protocol that is sent from a switch (in the embodiment shown in FIG. 1, switch A 102). The command instructs switch B 104 to conduct a VPA test on the in-progress telephone call.

Switch A 102 sends a modified Initial Address Message (IAM) 114 using out of band signaling. STP 106 routes the IAM 114 to switch B 104. After switch B 104 receives IAM 114 indicating a continuity test is required, switch B 104 connects continuity test equipment to the specific trunk member indicated in IAM 114. Switch A 102 completes the continuity test and sends a Continuity Test (COT) message 116 to Switch B 104. Therefore, the trunk member is used as the selected voice path between switch A 102 and switch B 104 for this telephone call, and this trunk group member is the resource that is subjected to VPA testing.

In order to conduct the VPA test, switch A 102 and switch B 104 attach transceivers to the specified member of the trunk group via a hardware connection internal to the switch and under control of the system processor(s). Preferably, there is a first transceiver 120 associated with switch A 102 and a second transceiver 122 associated with switch B 104. The transceivers 120 and 122 send and receive test signals, for example, test tones, back and forth, using the selected member of the trunk group for this specific in-progress telephone call.

Network 100 determines if the VPA test has been successful. If the test is successful, then network 100 routes the telephone call using the selected trunk group. If the test is not successful, then network 100 instructs switch A 102 and/or switch B 104 to select another trunk resource for the voice path.

As is apparent from the above example, VPA testing occurs on a per-call basis, on a specific selected member of a trunk group. In other words, some telephone calls are completed without VPA testing and some calls are completed after VPA testing has been conducted. Generally, VPA testing is done before the telephone call is connected and the specific network resource that is going to be used for the voice path for the telephone call is subjected to VPA testing. It is known in the industry to set the VPA testing level at fixed amounts. For example, VPA testing can be set at various fixed rates, including 0%, 5%, 12%, 25%, 50% and 100%. These are common rates used currently in the industry and other fixed rates might be selected. These percentages refer to the percentage of telephone calls that will include VPA testing prior to the call. For example, if the VPA rate is fixed at 12%, then 12% of all telephone calls will include VPA testing before the call is connected. Also, different rates can be applied to different network resources. Generally, the rates are set to test trunk groups, the members of trunk group 108 being an example, so that a certain percentage of calls placed over the trunk group are tested.

In the past, the rate or amount of testing conducted on a particular trunk group and its associated members was fixed and could only be manually adjusted. For example, if a particular trunk group was newly established, or perhaps using newly constructed facilities, the VPA testing rate would be temporarily set much higher than normal, for example, 50%, 75% or 100%, because of the threat to the integrity of the trunk group or its associated facilities..

Figure 2:
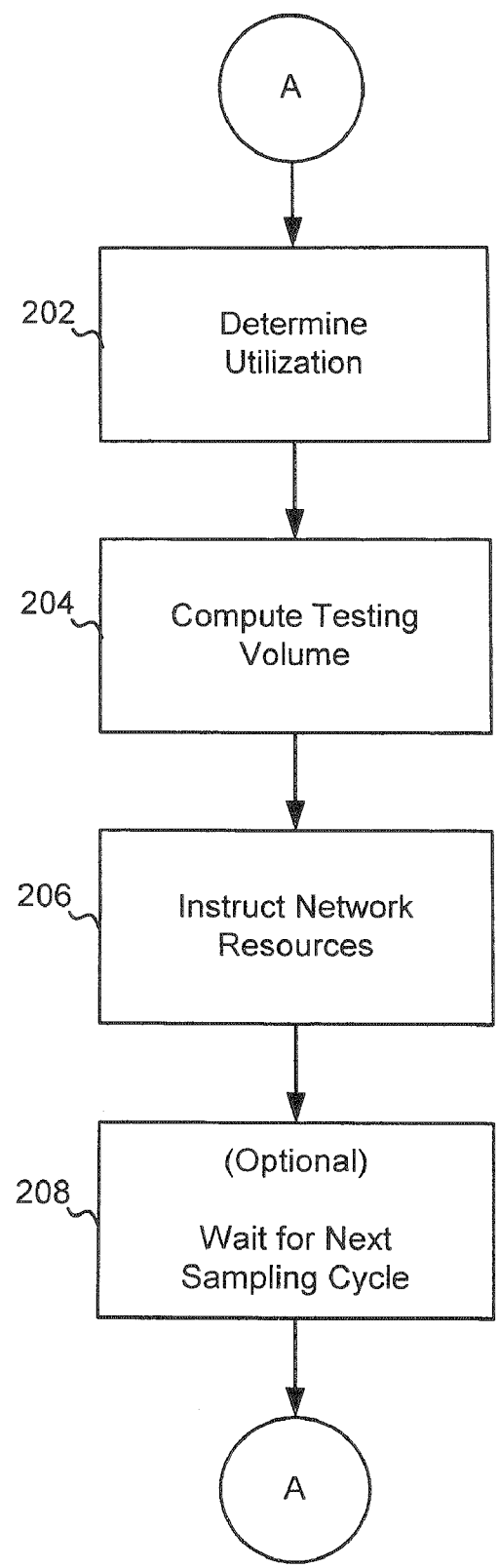
FIG. 2 is a flow diagram of a preferred embodiment of a method in accordance with the present invention.

FIG. 2 is a schematic diagram of an embodiment of the present invention. As opposed to the fixed percentage system, the embodiment shown in FIG. 2 varies the level of VPA testing depending on certain conditions. In step 202, the utilization of a system resource is determined. Some examples of system resources whose utilization level can be determined include tone transceivers, processor occupancy, physical paths through a switch, and availability of switch connections to establish a physical path. The amount of utilization is used to compute the volume, amount or rate of VPA testing that is to be conducted in step 204. Generally, a predefined relationship between the utilization of a network resource and the amount of VPA testing is used to compute the actual testing volume. An example of how to determine the predefined relationship is provided below in FIG. 3.

After the amount of testing volume has been computed in step 204, then the network provides instructions or commands to the various network resources to conduct the appropriate amount of testing. This is done in step 206. After step 206 has been accomplished, the process may use an optional step 208 of waiting for the next sampling cycle. If step 208 is omitted, the process returns to step 202 immediately after the network resources have been instructed, and a new determination of the utilization of network resources is determined.

Using this process, the amount of VPA testing conducted is dynamic and variable. Accordingly, without further human or operator intervention, the system automatically sets and resets the level of VPA testing based on network utilization. In some embodiments, the level of VPA testing is continuously reset (if step 208 is omitted) and in some embodiments, the level of VPA testing is occasionally reset based on a predetermined delay (if step 208 is used). For example, the delay or cycle time can be set at any desired time frame and can be as short as fractions of a second, a few seconds, or as long as a minute, a few minutes or even longer.

Figure 3:
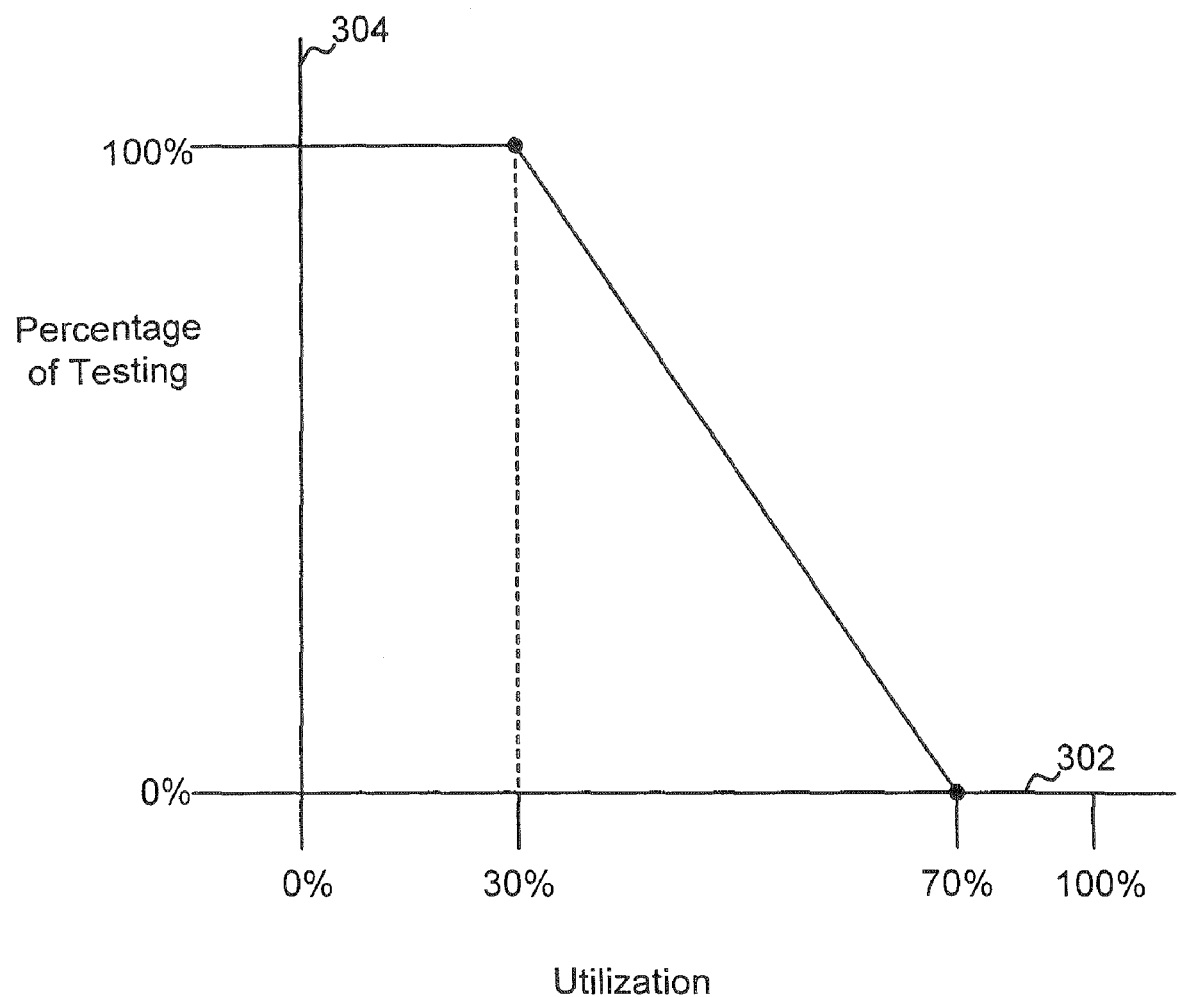
FIG. 3 is a graph illustrating an exemplary relationship between the percentage of testing and utilization in accordance with the present invention.

In step 204 (see FIG. 2), some embodiments of system 100 compute the volume of testing that is to be conducted. FIG. 3 shows a graph of an embodiment of the present invention. FIG. 3 shows an example of a relationship that can be used to assist in computing the testing volume. The horizontal axis 302 represents the amount of utilization and the vertical axis 304 represents the percentage or amount of testing that is conducted. In this embodiment, the amount of testing is generally inversely proportional to the utilization of the network. In other words, when the network is not very busy, there is a lot of VPA testing that is conducted and as the network becomes busier, the amount of testing is gradually reduced. In some cases, it is possible to disable all testing so that no testing is done on the network at all.

As shown in FIG. 3, 100% of all of the telephone calls include VPA testing as long as the utilization of the switching system remains under about 30%. At that point, the amount of VPA testing starts to be reduced. As shown in FIG. 3, the rate or level of testing is generally linearly reduced until the switching system utilization reaches 70%. At that point, none of the telephone calls include VPA testing, and VPA testing is effectively terminated. This is done to conserve network resources and to devote more network resources to establishing telephone calls as opposed to testing trunk group members. Of course, other relationships, including non-linear relationships, can also be used to assist in computing a test volume. The above embodiment can be used in conjunction with central control architecture switches.

Figures 4, 5, 6:
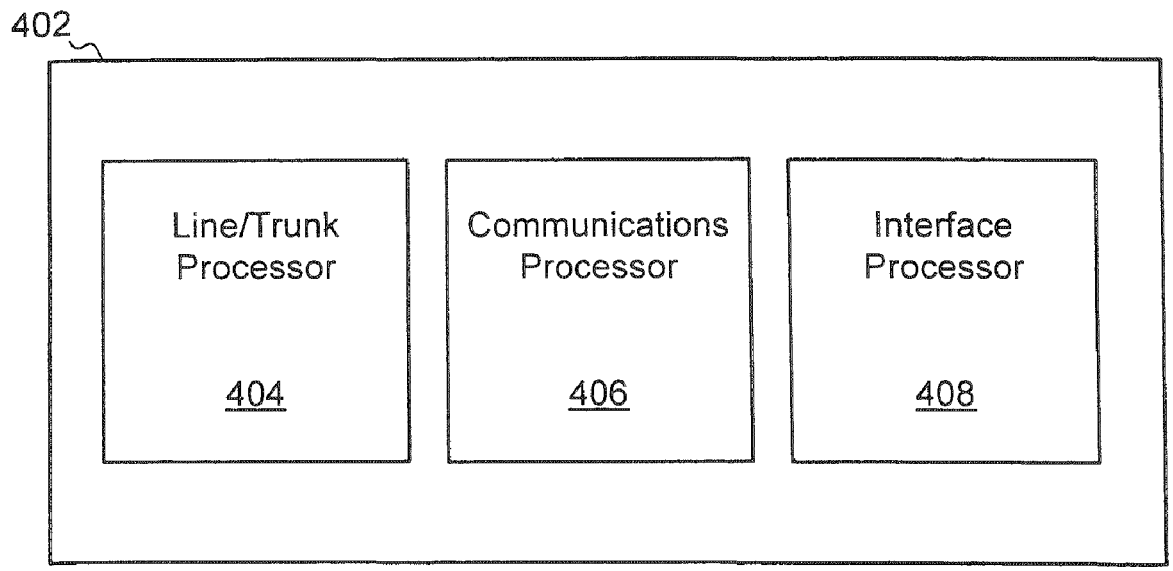
FIG. 4 is a schematic diagram of a preferred embodiment of a distributed architecture switch in accordance with the present invention.
FIG. 5 is an exemplary equation that could be used in a preferred embodiment to calculate a composite occupancy value in accordance with the present invention.
FIG. 6 is an exemplary equation that could be used in a preferred embodiment to calculate a composite occupancy value in accordance with the present invention.

Distributed architecture switches can use different procedures or algorithms to assist in computing the amount of VPA testing that is to be conducted. FIG. 4 is a schematic diagram of a distributed architecture switch 402 (referred to as "DA switch"). DA switch 402 includes a line/trunk processor 404, a communications processor 406, and an interface processor 408. Obviously, one or more of each type of processor can be used in a single DA switch 402, and it is often the case that a single DA switch 402 will include multiple processors of the same kind.

Line/trunk processor 404 includes interfaces to various different lines and/or trunks. There can be a number of these processors, depending on the size of a central office. Communications processor 406 controls communications paths between different line/trunk processors. Generally, there is just one communications processor 406. Interface processor 408 provides a signaling interface between the lines and/or trunks and the SS7 network. Generally, in a given DA switch 402, there is only one interface processor 408.

During operation, the various different processors will experience different occupancies and loads. In the case of a DA switch 402, all of the occupancy levels of the different processors are preferably taken into account in determining the amount of VPA testing applied to a particular trunk group. In an embodiment of the present invention, the occupancy levels of the different processors are assigned various weights. The occupancy levels and weights are then used to compute a composite system occupancy (CSO) for the DA switch.

FIG. 5 shows an equation that can be used to compute CSO in an embodiment of the present invention. In the embodiment shown in FIG. 5, CSO (the composite system occupancy) is equal to the average of the weighed occupancies of the various processors.

$W1$ refers to the weight assigned to line/trunk processor units 404.

$x$ refers to the actual occupancy of line/trunk processor 404.

$W2$ refers to the weight assigned to communications processor unit 406.

$y$ refers to the actual occupancy of communications processor 406.

$W3$ refers to the weight assigned to interface processor unit 408.

$z$ refers to the actual occupancy of interface processor 408.

The weights can be designed to model different conditions and to assign greater value or importance to the various processors. In an embodiment of the present invention, the processors are accorded the following weights. The Interface processor 408 is considered the most important processor, the communications processor 406 is considered the next important processor, and the trunk/line processor 404 is considered the least important processor. Because of these considerations, interface processor 408 is weighted the highest, communications processor 406 is weighted the second highest, and trunk/line processor 404 is weighted the least highest. Expressed mathematically, $W3>W2>W1$.

The weights are multiplied by the actual occupancy levels of the various processors, and these products are added together. The sum can be used or the sum can be divided by 3 to arrive at a composite or average occupancy level for DA switch 402.

FIG. 6 is an equation related to another embodiment of the present invention. In FIG. 6, instead of absolute weights, a weight percentage is used instead. $WP1$ refers to the weight percentage assigned to line/trunk processor 404, $WP2$ refers to the weight percentage assigned to communications processor 406, and $WP3$ refers to the weight percentage assigned to interface processor 408. The definition of terms, x, y, and z from FIG. 5 apply to this embodiment as well. In this embodiment, because the factors multiplying the actual occupancy levels of the various processors are percentages, $WP1+WP2+WP3=1$. The products of the weight percentages multiplied by the actual occupancy levels are added together to arrive at a composite occupancy rating for DA switch 402.

Another factor that can be used to assist in determining the level of VPA testing conducted is the individual occupancy level of each of the different processors. In this embodiment, if the level of occupancy of any of the various processors rises above a certain, predetermined threshold, then the system ceases VPA testing. This procedure can be used with any type of switch. However, for simplicity and clarity, the following description is provided in terms of a DA switch.

Figure 7:
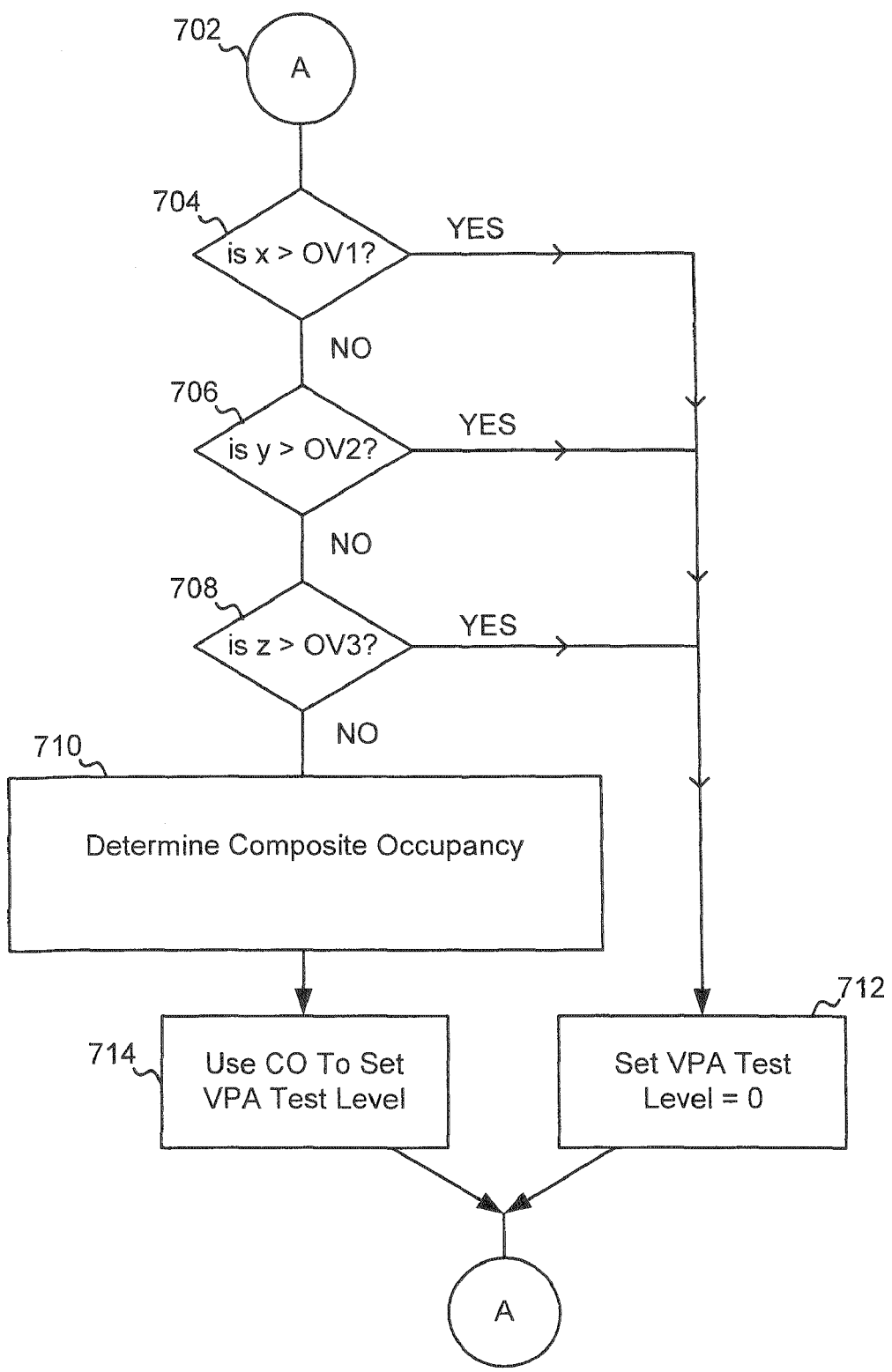
FIG. 7 is a flow diagram of a preferred embodiment of a procedure for determining a VPA test level in accordance with the present invention.

FIG. 7 is a flow diagram of an embodiment of the present invention, disclosing threshold considerations. The procedure begins at step 702. In the first step 704, a determination is made regarding the occupancy level x of a line/trunk processor. If the occupancy of the line/trunk processor is not greater than a predetermined overload level, OV1, then the procedure moves to step 706. In this step, the occupancy y of the communications processor is determined. If the occupancy y is not greater than a second predetermined overload level, OV2, then the process moves to step 708. In this step, the occupancy z of the interface processor is considered. If z is not greater than the predetermined overload condition, OV3, for the interface processor, then a composite occupancy level is computed in step 710. After the composite occupancy of the switch has been computed, then that composite occupancy level determined in step 710 is used in step 714 to set a new VPA test level.

As shown in FIG. 7, if any of the occupancies of any of the processors is above their predetermined levels, then the procedure moves to step 712 where the VPA test level is set to 0. In other words, if the system determines that any of the different processors is busy beyond a predetermined level, then the system shuts down VPA testing.

Returning briefly to FIG. 2, in step 202, the utilization of a trunk line is determined or retrieved. There are many different ways this can be accomplished. The utilization of a trunk line can be directly measured or the utilization of a trunk line can be derived and/or estimated by directly measuring some other phenomena or device.

The foregoing disclosure of the preferred embodiments of the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A system for conducting voice path assurance testing in a communications network, the system comprising:
    a first processor having a related first occupancy level; and
    a second processor having a related second occupancy level, wherein a composite occupancy level is computed using both the first occupancy level and the second occupancy level, and an amount of voice path assurance testing to be conducted on the communications network is determined using the composite occupancy level.

2. The system of claim 1, wherein the first processor is an interface processor.

3. The system of claim 1, wherein the second processor is a communications processor.

4. The system of claim 1, further comprising a third processor having a related third occupancy level, wherein the third occupancy level is also used to compute the composite occupancy level.

5. The system of claim 4, wherein the third processor is a trunk/line processor.

6. The system of claim 1, wherein different weights are assigned to different occupancy levels.

7. The system of claim 1, wherein a first weight associated with the first occupancy level is greater than a second weight associated with the second occupancy level.

8. The system of claim 4, wherein a second weight associated with the second occupancy level is greater than a third weight associated with the third occupancy level.

9. The system of claim 1, wherein the voice path assurance testing ceases when the first occupancy level reaches a first predetermined threshold.

10. The system of claim 1, wherein the voice path assurance testing ceases when the second occupancy level reaches a second predetermined threshold.

11. The system of claim 4, wherein the voice path assurance testing ceases when the third occupancy level reaches a third predetermined threshold.

* * * * *